United States Patent
Marmigere et al.

(10) Patent No.: US 7,296,156 B2
(45) Date of Patent: Nov. 13, 2007

(54) SYSTEM AND METHOD FOR SMS AUTHENTICATION

(75) Inventors: Gerard Marmigere, Drap (FR); Zsolt Szalai, Tourrettes-sur-Loup (FR)

(73) Assignee: International Business Machines Corporation, Armonk, NY (US)

(*) Notice: Subject to any disclaimer, the term of this patent is extended or adjusted under 35 U.S.C. 154(b) by 559 days.

(21) Appl. No.: 10/600,887

(22) Filed: Jun. 20, 2003

(65) Prior Publication Data
US 2004/0030906 A1   Feb. 12, 2004

(30) Foreign Application Priority Data
Jun. 20, 2002   (EP)   ................... 02368063

(51) Int. Cl.
*H04L 9/00* (2006.01)
*H04K 1/00* (2006.01)
*H04M 3/00* (2006.01)

(52) U.S. Cl. .............. 713/170; 380/286; 380/247; 455/418

(58) Field of Classification Search ............. 713/168, 713/170; 380/286, 247; 455/418
See application file for complete search history.

(56) References Cited

U.S. PATENT DOCUMENTS

| | | | | |
|---|---|---|---|---|
| 2,384,392 A * | 9/1945 | Page ................. 66/172 E |
| 5,864,757 A * | 1/1999 | Parker ................ 455/418 |
| 6,119,000 A * | 9/2000 | Stephenson et al. ..... 455/432.1 |
| 6,377,791 B1 * | 4/2002 | Pirila ................ 455/410 |
| 6,385,727 B1 * | 5/2002 | Cassagnol et al. ......... 713/193 |
| 6,438,666 B2 * | 8/2002 | Cassagnol et al. ......... 711/163 |
| 6,539,237 B1 * | 3/2003 | Sayers et al. ............ 455/555 |
| 6,707,915 B1 * | 3/2004 | Jobst et al. ............. 380/247 |
| 6,741,848 B2 * | 5/2004 | Timonen et al. ........... 455/405 |
| 6,993,359 B1 * | 1/2006 | Nelakanti et al. ........ 455/554.1 |
| 7,116,786 B2 * | 10/2006 | McKibben et al. .......... 380/286 |
| 7,149,545 B2 * | 12/2006 | Hurst et al. ............. 455/558 |
| 7,200,384 B1 * | 4/2007 | Tervo et al. ............ 455/414.1 |
| 2001/0039620 A1 * | 11/2001 | Berry et al. ............. 713/193 |
| 2002/0009199 A1 * | 1/2002 | Ala-Laurila et al. ....... 380/247 |
| 2002/0038429 A1 * | 3/2002 | Smeets .................. 713/193 |
| 2002/0039904 A1 * | 4/2002 | Anderson ................ 455/456 |
| 2002/0129245 A1 * | 9/2002 | Cassagnol et al. ......... 713/168 |
| 2003/0123669 A1 * | 7/2003 | Koukoulidis at . ....... 380/281 |
| 2003/0224823 A1 * | 12/2003 | Hurst et al. ............. 455/558 |

FOREIGN PATENT DOCUMENTS

GB   2384392 A * 7/2003

* cited by examiner

*Primary Examiner*—Emmanuel L. Moise
*Assistant Examiner*—Techane J. Gergiso
(74) *Attorney, Agent, or Firm*—Norman L. Gundel; Hoffman, Warnick & D'Alessandro LLC

(57) ABSTRACT

The disclosed invention allows security of configuration SMS messages through the use of encryption computed with the International Mobile Equipment Identity (IMEI) as a key. Particularly, a text messaging system having the ability to send SMS messages to remotely managed wireless terminal equipment comprises means to generate an encrypted bit string based on the IMEI shared key and to signal use of the security mechanism in available Information Element fields of the TP-User Data of the SMS message. The receiving wireless terminal equipment is configured to process configuration SMS messages encrypted using the IMEI as a key.

10 Claims, 3 Drawing Sheets

SYSTEM AND METHOD FOR SMS AUTHENTICATION

TECHNICAL FIELD

The present invention relates to the management of wireless terminal user equipment in general and in particular to a system and method for securing such equipment against malicious use of the so-called Short Message Service.

BACKGROUND OF THE INVENTION

History has shown through phenomenons that have accompanied large scale development of the personal computer, that there is a category of people who find interest in maliciously penetrating other users' computing systems. Their motivation can include direct material benefit (e.g. use of a user's credentials stored in the computer to perform commercial or financial transactions), or benefit derived from access to confidential information (private information, trade or technology secrets). Sometimes it is just for the -arguable- fun of the performance (e.g. password cracking, virus dissemination, etc.). Whichever the motivation, this behavior is a strong indication that, when a new field of action opens up, the same energy will be spent on malicious attacks.

The wireless communications environment is one of the next likely fields of action. Mobile telephony has grown to hundreds of millions of users and is keeping a strong status image. In addition, mobile device evolution is clearly directed toward development of increasing computing power: faster processors, substantial storage, functional and applications richness. In fact, the catalogue of most major mobile device vendors includes devices that look very much like personal computers and in an increasing number of instances can replace them. Those devices, as they continue evolving, will play a significant role in business and personal activities.

Mobile communication networks may support various wireless technologies, and particularly the European Standard known as the Global System for Mobile Communications (GSM) or the enhanced General Packet Radio Services (GPRS). Text messages, particularly Short Message Services (SMS) messages may be exchanged between mobile devices through Short Message Service Centers (SMSC). A specific short message type handled by digital wireless networks enables the receiving mobile devices to be remotely managed by a remote device management application system. Such specific SMS results in parameter change commands or software elements to be applied to the device and it will be referred to as 'Configuration SMS' for this discussion. Configuration SMS's may be used in two ways to remotely manage GSM or GPRS-connected mobile devices from the device management application. A first approach is to use the SMS as a content vehicle carrying actual configuration parameters to be applied to the device. A second approach is to use SMS as a trigger to which the device responds by launching a connection (e.g. Over-The-Air (OTA) connection, SyncML/DM connection) to a management server to perform management-oriented synchronization activities (such as Inventory, Configuration, Software Download).

In both cases, the use of the SMS technology "as is" is exposing the device to malicious attempts. If the SMS carrying configuration instructions is of malicious origin, commands or software elements carried by the SMS can introduce malicious entities into the terminal equipment (e.g. undesired parameter changes, personal information retrieving, virus code downloading to name a few). If the SMS is used to trigger a management session to a spoof server, similar malicious actions may be performed over the management session. In fact, a mere knowledge of the mobile device's telephone number (also known as the MSISDN) and a basic skill in the SMS technology suffice to gain access.

Thus, it has been a main concern to secure the SMS against hacker attacks. Some recommendations for GSM security have been made available for example in the ETSI GSM 03.48 Technical Specification titled "Security Mechanisms for the SIM application toolkit". While this publication addresses somehow the SMS security problem, the described mechanism only covers security for SMS's carrying executable information to be loaded onto the Subscriber Identity Module (SIM card). However, using the SIM card to remotely configure a wireless device with SMS is only one way to operate. Several other possibilities exist where the configuration parameters and the software carried in the SMS's may be applied to the device's operating system without execution in the SIM card. Therefore, there is still a potential target for hacker attacks.

Moreover, a drawback of the SIM-oriented implementation is that the SIM card is associated with the service subscription, i.e. the Wireless Network Operator. As a consequence, the existing security solution is limited to its use by the Operator.

It is therefore essential to apply a commensurate level of security against malicious tampering with the device configuration and software integrity attempted through means that bypass the SIM card.

There is a real need for a more general purpose security solution for wireless terminal user equipment remotely managed through SMS messages, which is independent of the Subscriber Identity Module.

The present invention offers such solution.

SUMMARY OF THE INVENTION

It is therefore a feature of the invention to provide a system and method to secure the use of wireless terminal user equipment.

It is another feature of the invention to prevent malicious use of SMS's when remotely managing wireless user terminal equipements.

It is another feature of the invention to provide a system and method to secure remote management of a wireless device using Configuration SMS'S.

It is yet another feature of the invention to provide a system and method that is applicable to both Wireless Network Operators but also to any other party, typically the Management Services Outsourcers or Enterprises.

The present invention allows SMS messages protection through their encryption computed with the International Mobile Equipment Identity (IMEI) number as a shared key.

In a first embodiment, the invention applies in a text messaging system having the ability to send at least one text message to a wireless terminal equipment wherein the text message contains an information data field and a text data field. The text messaging system preferably comprises means for storing an equipment identification number uniquely assigned to the wireless terminal equipment; means coupled to the equipment identification number storing means for encrypting the text data field content using the equipment identification number assigned to the wireless terminal equipment as the shared key; and means for setting an encryption identifier in the information data field of the at least one text message.

In a GSM network application, the text message is a Short Message Service (SMS) message having a SMS header and TP-User Data that contains configuration commands to remotely manage a SMS mobile device. In this environment, the equipment identification number is the International Mobile Equipment Identity (IMEI) number assigned to the mobile device.

The more general wireless terminal equipment to be used in the present invention comprises means for storing a personal equipment identification number, and means for receiving an encrypted text message. It further comprises means for determining if the received encrypted text message contains an encryption identifier that signals the use of the equipment identification number as a shared key encryption. Moreover, the wireless terminal equipment comprises means for decrypting the encrypted text message by using the personal equipment identification number read from a storage memory of the wireless terminal equipment. The decryption process generates an equipment identification number that is compared to the personal equipment identification number of the device. The message is finally processed or rejected according to the comparison result.

In another embodiment, a method for a authenticating a text message sent by a text messaging system to a wireless terminal equipment having means for storing a personal equipment identification number, the text messaging system comprising means for storing an equipment identification number uniquely assigned to the wireless terminal equipment, and wherein the text message having information data field and text data field, includes the steps of: at the text messaging system:

encrypting the text data field content by using the equipment identification number assigned to the wireless terminal equipment as the shared key;

setting an encryption identifier in the information data field of the at least one text message; and sending the encrypted at least one text message to the wireless terminal equipment;

at the wireless terminal equipment:

receiving the encrypted at least one text message;

determining if the received encrypted at least one text message contains an equipment identification number as a shared key encryption; and decrypting the received encrypted at least one text message using the personal equipment identification number of said wireless terminal equipment as a shared key.

Alternatives to the above-described embodiments are set forth in the appended claims.

BRIEF DESCRIPTION OF THE DRAWINGS

The above and other features and advantages of the invention will be better understood by reading the following more particular description of the invention in conjunction with the accompanying drawings wherein.

DETAILED DESCRIPTION OF THE INVENTION

Figure 1:
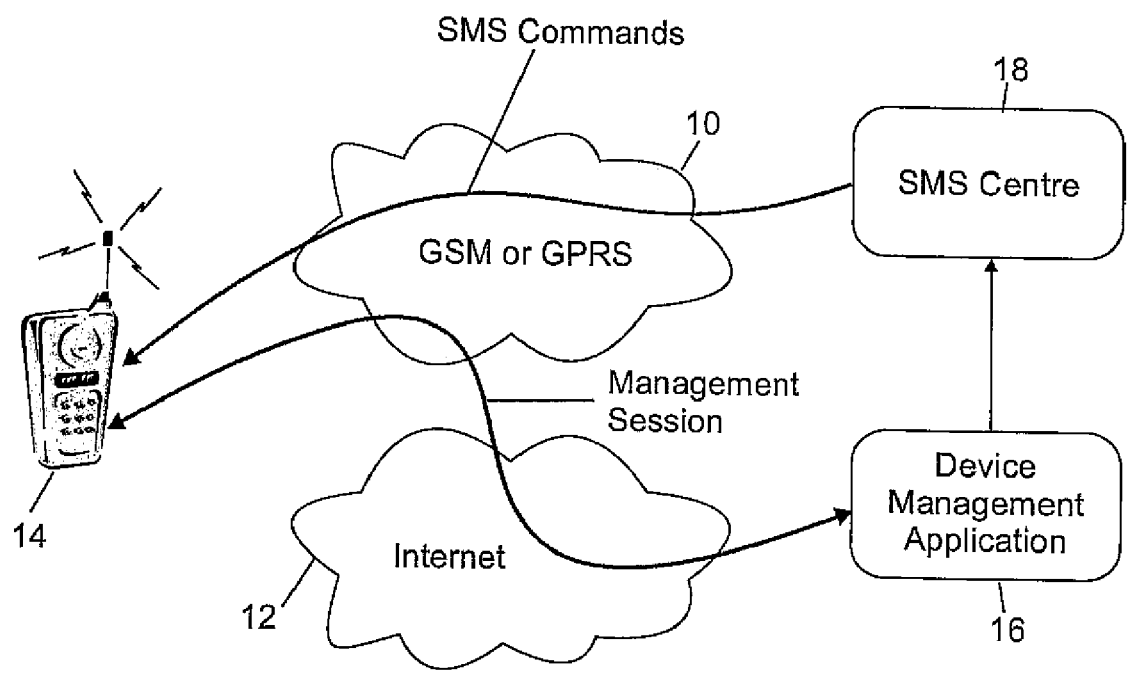
FIG. 1 shows a general view of the communication environment in which this invention applies.

Referring first to FIG. 1, there is depicted a pictorial representation of a text message communication system which may be utilized to implement the method of this invention. As may be seen, message communication systems may include composite networks, such as GSM or GPRS networks 10 and Internet network 12. A wireless terminal equipment 14, which may be for example a mobile phone, is remotely managed by a device management application system 16. This embodiment is hereby described for one wireless device remotely managed but as those skilled in the art will easily understand it may be generalized to a plurality and variety of wireless terminal equipment (such as POS, hand-held computers, PDA, . . . ). Each wireless terminal equipment 14 is identified by a unique equipment identification number which is stored in a memory part of the terminal. The device management application system 16 comprises an equipment identification database to store all the identification numbers of the wireless terminals that may be recognized by the management system 16. Generally in GSM networks, such database is known as being an Equipment Identity Register (EIR) that contains all valid mobile phone equipment.

It is to be mentioned that the mobile device may also contain a SIM card to carry individual information relative to the subscriber. No further details of the SIM card functions are hereby developed as it is not useful for the understanding of the invention.

A text message as used in this invention, preferably refers to a Short Message Service (SMS) message sent over the GSM or GPRS network and that allows remote management of wireless terminal equipment. The SMS may contain commands like change instructions for the terminal equipment or may serve as a trigger to launch a management session with the management server. The path of the SMS message issued from the device management application system 16 may comprise an SMS Center (SMSC) 18 which is responsible for the relaying, storing and forwarding of SMS's.

Figure 2:
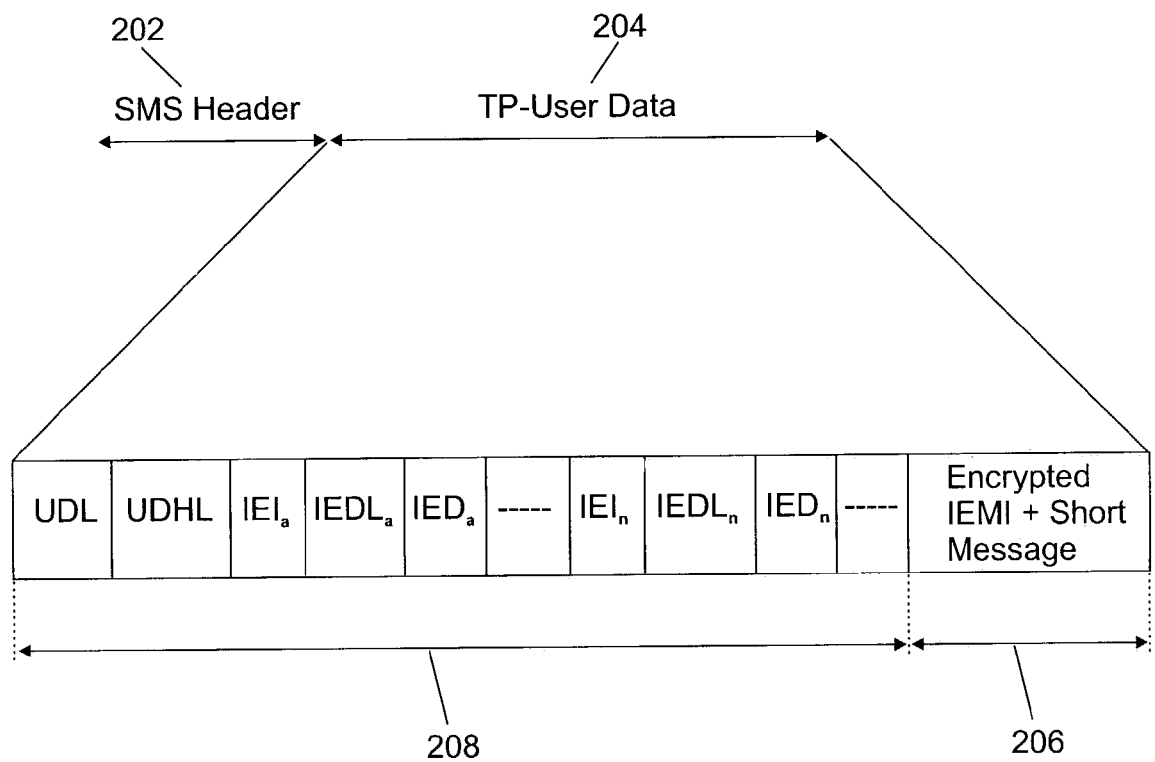
FIG. 2 details the User Data part of a SMS frame.

An SMS that is to be received by the mobile device 14 is a data frame structured as it is now described with reference to FIG. 2. FIG. 2 is a representation of a SMS frame as specified in the 3GPP Technical Specification document "3rd Generation Partnership Project; Technical Specification Group Terminals; Technical realization of the Short Message Service (SMS) (Release 1998)" (referenced 3GPP TS 03.40 V7.5.0 (2001-12).

The SMS message contains a SMS frame Header 202 and a SMS frame Body 204. Generally speaking, the frame Header 202 contains the information related to the propagation, delivery, status and purpose of the SMS.

The frame Body 204 which is also known in the literature as the TP-UD (Transfer-Layer Protocol User Data) may comprise just the short message content itself 206, i.e. the commands to manage the SMS receiving device, or it may have in addition a User Data Header (UDH) 208. Presence of a User Data Header is identified by the setting of an indicator in the SMS frame Header, namely the User Data Header Indicator (UDHI). Where the UDHI value is set to zero the TP-UD field comprises only the short message. Where the value is set to one, it means that the TP-UD field comprises a User Data Header. The UDHI parameter is used in the method of the invention as it will be described later with reference to FIG. 3.

The generalized structure of the User Data Header is zoomed on bottom of FIG. 2, and is mainly made of User Data fields (UDL,UDHL) and a plurality of Information Element groups (IE_a to IE_n). The User Data fields specify the User Data Length (UDL) i.e. the length of the entire message, and the User Data Header Length (UDHL) i.e. the length of the total UDH. Each Information Element group is composed of an Information Element Identifier field (IEI), an Information Element Data Length field (IEDL) and an Information Element Data field (IED). Some IE groups are currently reserved for specific purposes, for example for Command Packet designation, and the reader may refer to the aforementioned 3GPP Technical Specification document to learn more about it. However, some IE groups are not allocated and free of use, and the present invention takes this advantage to allocate an IE group for signaling the use of encryption security. Specifically, the use of encryption using IMEI as a key is signaled through the insertion of a marker (for instance the character string "IMEI") in an Information Element Data field, and the corresponding IEI and IEDL fields are set to the correct values to indicate the presence and length of the marker.

As already mentioned and as denoted on reference 206 'encrypted IMEI+short message', the encrypted message is a bit string generated from the IMEI number and the Short Message content. Such computation is conventional and various algorithms such as the so-called Data Encryption Standard (DES) may be used to obtain the encrypted value.

To allow verification of successful decryption, the message sending system preferably prefixes the actual text message with the IMEI number. If the system operates into conformity with the GSM standard, the IMEI number is fifteen bytes long. However, it is to be appreciated by the person skilled in the art that the invention may be implemented with any other byte lengths of an equipment identification number. Through parsing of the decrypted string, the wireless device receiving the encrypted message can verify the matching of the first fifteen bytes with its personally stored IMEI number to establish successful decryption or not.

Figure 3:
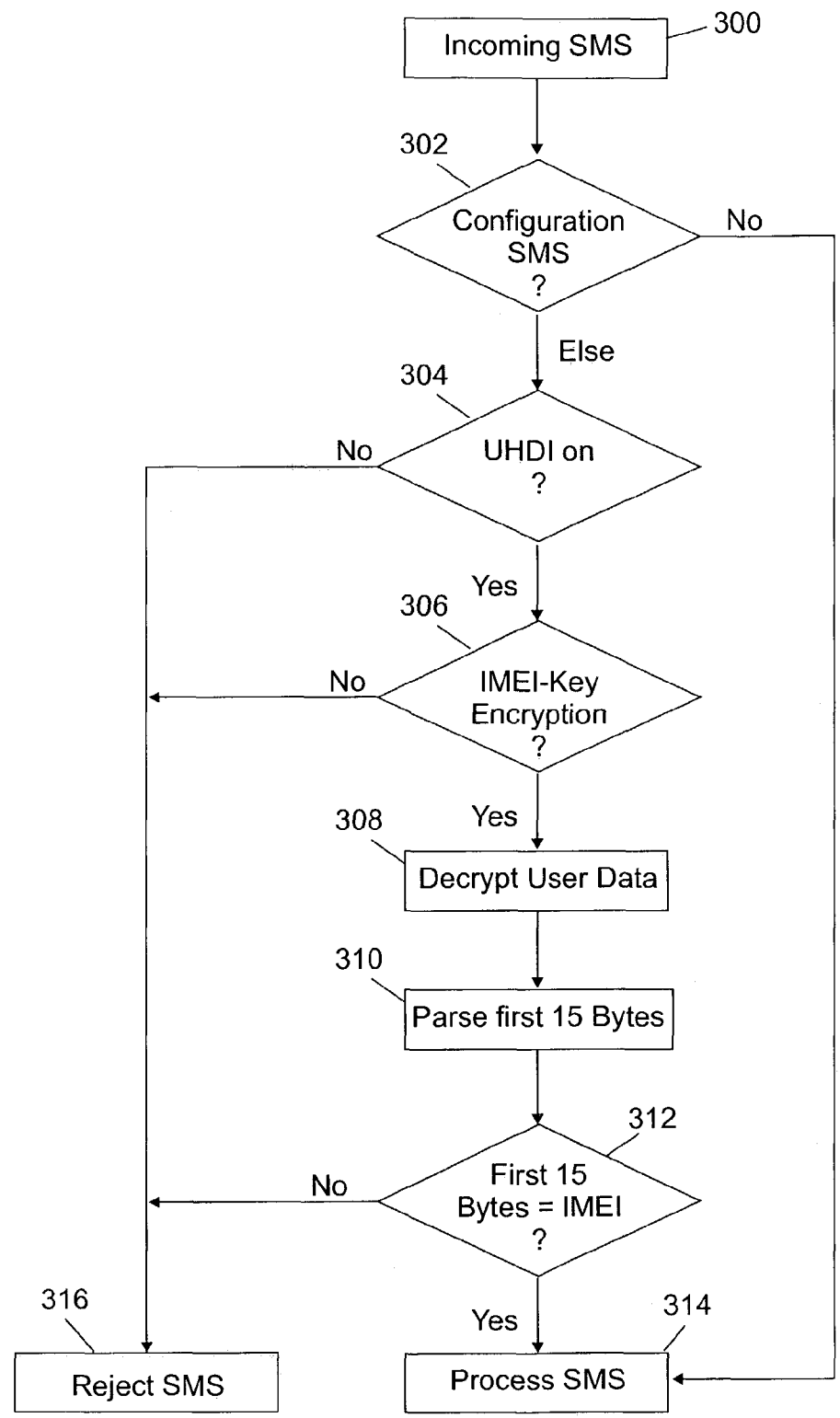
FIG. 3 is a flow diagram of the routine processed at the receiving mobile device.

FIG. 3 is a flow diagram of the routine performed at the mobile device receiving an encrypted SMS message. The routine is preferably implemented in a processing area of the mobile device which is outside of the SIM card. Once more, it is to be highlighted the advantage of the present invention over existing alternatives in that the encryption method is not linked to the Subscriber Identification Module.

The process starts with the receipt of an incoming SMS message (step 300).

On first step 302, as part of conventional SMS processing in wireless equipment, a verification is made to check if the message is really containing configuration instructions or software to be installed. If not, the SMS is processed normally as a conventional SMS message (step 314).

If the message is of the type enhanced with configuration commands, the process enters the encryption checking. The SMS frame Header is looked up (step 304) to locate a User Data Header Indicator (UDHI). If no UDHI is encountered (branch No) the SMS is rejected (step 316).

If a User Data Header Indicator is found, next step 306 allows to check if an Information Element (IE) group in the User Data Header is dedicated to the signaling of the IMEI-based encryption. More specifically, it is checked for the presence of an Information Element Identifier (IEI), an Information Element Data Length (IEDL) and an Information Element Data (IED) allocated to the IMEI encryption security.

If no IMEI dedicated IE group is found (branch No), the SMS is rejected (step 316) because again the SMS does not conform to the security requirement of having encryption.

If an IMEI dedicated IE group is found (branch Yes), decryption of the message is attempted on step 308. The decryption operation uses the IMEI key already stored in a memory space of the mobile device. It is to be appreciated that the decryption algorithm itself is not detailed as any such known procedures may be applied as far as the IMEI key is used.

The decryption result is next parsed (step 310) to extract the first fifteen bytes, which are then compared to the IMEI personal number stored in the mobile device memory (step 312).

A mismatch leads to the SMS being rejected (step 316) while a match allows the SMS to be processed (step 314).

To summarize, the present invention offers a security mechanism for the Configuration SMS messages through an encryption based on a confidential key. The key is the IMEI (International Mobile Equipment Identity) number which offers several advantages:

- each GSM or GPRS mobile equipment has its own and unique IMEI;
- the IMEI plays no role in the communications between Users and is therefore not published,
- the IMEI already exists, which avoids having to introduce a new scheme to create and distribute the keys.

In addition, the IMEI is tied only to the device and is independent from the service subscription as materialized by the SIM card. Therefore, the present invention applies to device management performed by the Wireless Network Service Provider but also any other party, for instance Management Services Outsourcers or Enterprises.

The activation of the encryption security requires both parties to agree on its use. The managing party needs to encrypt the message and activate the "Encryption Using IMEI" field in the User Data Header of the SMS while the user needs to be using a device that is enabled to decrypt a message using the IMEI as the key.

It is to be appreciated by those skilled in the art that while the invention has been particularly shown and described with reference to a preferred embodiment thereof, various changes in form and details may be made without departing from the spirit and scope of the invention.

The invention claimed is:

1. A text messaging system for encryption of a text message sent to a wireless terminal equipment, the text message comprising a Short Message Service (SMS) message having a User Data Header (UDH) and a text data field, the text messaging system comprising:

means for storing an equipment identification number uniquely assigned to the wireless terminal equipment, wherein the assigned equipment identification number is an International Mobile Equipment Identity (IMEI) number of the wireless terminal equipment;

means coupled to the equipment identification number storing means for encrypting the text data field content of the SMS message using only the IMEI number assigned to the wireless terminal equipment as the shared key; and means for setting an encryption identifier in an Information Element (IE) group of the UDH of the SMS message, the encryption identifier comprising a marker in an IE data field, the IE group further comprising an Information Element Identifier (IEI) field set to indicate a presence of the marker, and an Information Element Data Length (IEDL) field set to indicate a length of the marker.

2. The system of claim 1 wherein the text data field of the SMS message comprises configuration commands to remotely manage the wireless terminal equipment.

3. The system of claim 1 wherein said wireless terminal equipment is a Short Message Service (SMS) receiving mobile device and said SMS message is carried over a wireless network.

4. The system of claim 1 wherein the means for generating an encrypted SMS message further comprising means for processing an encryption algorithm to compute a bit string using said assigned IMEI number as the shared key and the text data field content.

5. A method for authenticating a text message sent by a text messaging system to a wireless terminal equipment having means for storing an International Mobile Equipment Identity (IMEI) number, the text messaging system comprising means for storing an IMEI number uniquely assigned to the wireless terminal equipment, and wherein the text message comprises a Short Message Service (SMS) message having a User Data Header (UDH) and a text data field, the method comprising the steps of:
at the text messaging system:
encrypting the text data field content of the SMS message using only the IMEI number assigned to the wireless terminal equipment as the shared key;
setting an encryption identifier in an Information Element (IE) group of the UDH of the SMS message, the encryption identifier comprising a marker in an IE data field, the IE group further comprising an Information Element Identifier (IEI) field set to indicate a presence of the marker, and an Information Element Data Length (IEDL) field set to indicate a length of the marker; and
sending the encrypted SMS message to the wireless terminal equipment;
at the wireless terminal equipment:
receiving the encrypted SMS message;
determining if the received encrypted SMS message contains an IMEI number as a shared key encryption; and
decrypting the received encrypted SMS message using the IMEI number of said wireless terminal equipment as a shared key.

6. The method of claim 5 further comprising after the receiving step, the step of determining if the encrypted SMS message contains configuration commands to remotely activate the wireless terminal equipment.

7. A text messaging system for encryption of a text message sent to a wireless terminal equipment, the text message comprising a Short Message Service (SMS) message, the text messaging system comprising:
means for storing an equipment identification number uniquely assigned to the wireless terminal equipment, wherein the assigned equipment identification number is an International Mobile Equipment Identity (IMEI) number of the wireless terminal equipment;
means coupled to the equipment identification number storing means for encrypting the text data field content of the SMS message using only the IMEI number assigned to the wireless terminal equipment as the shared key;
means for setting an encryption identifier in an Information Element (IE) group of a User Data Header (UDH) of the SMS message, the encryption identifier comprising a marker in an Information Element (IE) data field, the IE group further comprising an Information Element Identifier (IEI) field set to indicate a presence of the marker, and an Information Element Data Length (IEDL) field set to indicate a length of the marker;
means for storing an IMEI number;
means for receiving the encrypted SMS message;
means for determining if the received encrypted SMS message contains an IMEI number as a shared key encryption; and
means for decrypting the received encrypted SMS message using the stored IMEI number of said wireless terminal equipment.

8. The system of claim 7 further comprising means coupled to the decrypting means for processing or rejecting the decrypted SMS message.

9. The system of claim 7 wherein the means for decrypting the received encrypted SMS message further comprising means for processing a decryption algorithm using said IMEI number as the shared key and the received encrypted SMS message content.

10. A method for authenticating a text message sent by a text messaging system to a wireless terminal equipment having means for storing an International Mobile Equipment Identity (IMEI) number, the text messaging system comprising means for storing an IMEI number uniquely assigned to the wireless terminal equipment, and wherein the text message comprises a Short Message Service (SMS) message, the method comprising:
at the text messaging system:
encrypting the text data field content of the SMS message using only the IMEI number assigned to the wireless terminal equipment as the shared key;
setting an encryption identifier in an Information Element (IE) group of a User Data Header (UDH) of the SMS message, the encryption identifier comprising a marker in an Information Element (IE) data field, the IE group further comprising an Information Element Identifier (IEI) field set to indicate a presence of the marker, and an Information Element Data Length (IEDL) field set to indicate a length of the marker; and
sending the encrypted SMS message to the wireless terminal equipment;
at the wireless terminal equipment:
receiving the encrypted SMS message;
determining if the received encrypted SMS message contains an IMEI number as a shared key encryption;
decrypting the received encrypted SMS message using the IMEI number of said wireless terminal equipment as a shared key; and
processing or rejecting the decrypted SMS message based on the decryption result.

* * * * *